Jan. 18, 1966   H. WEHDE ETAL   3,230,527
LANDING SYSTEM
Filed Dec. 11, 1963   2 Sheets-Sheet 1

INVENTORS
Heinz Wehde
Heinz Schröpl &
Wolfgang Limpert
BY Spencer & Kaye
ATTORNEYS

United States Patent Office 3,230,527
Patented Jan. 18, 1966

3,230,527
LANDING SYSTEM
Heinz Wehde, Wiesloch, Heinz Schröpl, Schwetzingen, and Wolfgang Limpert, Nussloch, Germany, assignors to Teldix Luftfahrt-Ausrüstungs G.m.b.H., Heidelberg, Germany
Filed Dec. 11, 1963, Ser. No. 329,667
Claims priority, application Germany, Dec. 11, 1962, T 23,187
19 Claims. (Cl. 343—9)

The present invention relates to a landing system for aircraft, particularly to a landing system which is adapted for use with airplanes capable of taking off and landing vertically, hereinafter referred to simply at VTOL, it being pointed out at the very outset, however, that the system according to the present invention is also suitable for use with conventional airplanes.

With the development of high-speed VTOL aircraft, their use and operational possibilities have become increasingly greater. The major advantage of high-speed VTOL craft is, undoubtedly, the fact that they do not require any take-off and landing strips, so that VTOL craft can be used in places which could heretofore not be considered as take-off and landing sites. However, this advantage can be used with maximum efficiency only if the airplane equipment, particularly the electronic gear, is adapted to this new type of flying capability of the craft. One piece of essential electronic equipment is a reliable landing system which can be used for VTOL craft.

In order to facilitate an explanation of the special requirements that have to be met by a landing system suitable for VTOL craft, a brief description will be given of the differences between a vertical landing and a conventional landing. A conventional landing is one during which the craft, while airborne in accordance with conventional aerodynamic principles makes a normal letdown and approach, whereafter it touches down at a relatively high speed and rolls to a stop, during which roll out the craft undergoes a greater or lesser deceleration.

When a VTOL craft lands, it decelerates from a speed at which the craft is ariborne solely in accordance with conventional aerodynamic principles to a speed equal to zero, this deceleration taking place before the craft begins its final descent prior to the actual touch-down. During this portion of the flight, the so-called transition phase, the aerodynamic lift is continuously replaced by the vertical component of the resultant jet force. The forward speed of the craft is decelerated, i.e., braked, by the horizontal component of the jet force as well as by drag resulting from the increasing angle of attack.

In order that the transition be carried out most efficiently, i.e., in order that the craft arrive at the desired hovering point at the time at which the craft has decelerated to zero, and in order also that the pilot does not start the transition phase too soon and thereby waste fuel, it is essential that the pilot know exactly the horizontal distance of the craft from the desired hovering point. A landing system for VTOL craft must therefore supply this information, as well as information insofar as the predetermined course and altitude, i.e., the course and altitude which the craft is supposed to follow and be at during its approach to the hovering point.

For reasons of accuracy, only a radio link from craft-to-ground-to-craft can be relied upon for measuring the distance of the craft from the landing point and for determining the bearing of the craft with respect to the target, or the deviation of the actual bearing from the bearing which the craft should be at in order to reach the landing point. An electronic altimeter can be used for measuring the altitude of the craft over the ground.

After these values have become available to the pilot he must, in addition to paying attention to the engine and flight instruments, also note the heading, distance and altitude of the craft with respect to the desired hovering point, and he must mentally process this information in order to translate the same into control commands which guide the craft. It will be appreciated, therefore, that if only the above aids are available to the pilot, the execution of a vertical spot landing is, in comparison to a conventional land, a very difficult maneuver, even if the craft is exceptionally well designed and highly maneuverable.

It is, therefore, the basic object of the present invention to provide a landing system with the help of which a vertical landing can be executed by a VTOL craft as reliably as a conventional aircraft equipped with conventional landing system can execute conventional landings.

Accordingly, the present invention resides in a landing system which is particularly suitable for use with VTOL craft, which system includes at least one radio marker beacon located at or near the desired landing point, and incorporates the following characteristic features:

(a) The distance of the craft from the desired landing point is measured continuously by means of high-frequency oscillations.

(b) The speed at which the craft is to travel during the landing is programmed in the craft, the program being played through in dependence on the measured distance.

(c) The speed which the craft is to travel during the landing—hereinafter referred to as the predetermined speed—is continuously compared with the actual speed of the craft which itself is obtained from the distance measurement.

(d) A correcting signal is derived from the difference between the two values, i.e., the predetermined speed and the actual speed.

(e) The aircraft is so controlled by the pilot, or by the automatic pilot, that this correcting signal becomes zero.

A significant point of the present invention, then, is that the pilot is no longer given absolute values but the deviations of the important values from pre-calculated, i.e., pre-determined, values that are stored, as programs. And since, in the final analysis, the pilot will, in response to readings represented by deviations from pre-calculated values, logically carry out only those control movements which follow from the readings, the difference values obtained can be fed directly to a flight control mechanism, i.e., to an automatic pilot, so that the entire vertical landing can be carried out fully automatically, in which case the pilot will be called upon simply to monitor the landing and to take over in case of emergency.

Additional objects and advantages of the present invention will become apparent upon consideration of the following description when taken in conjunction with the accompanying drawings in which.

Figure 1:
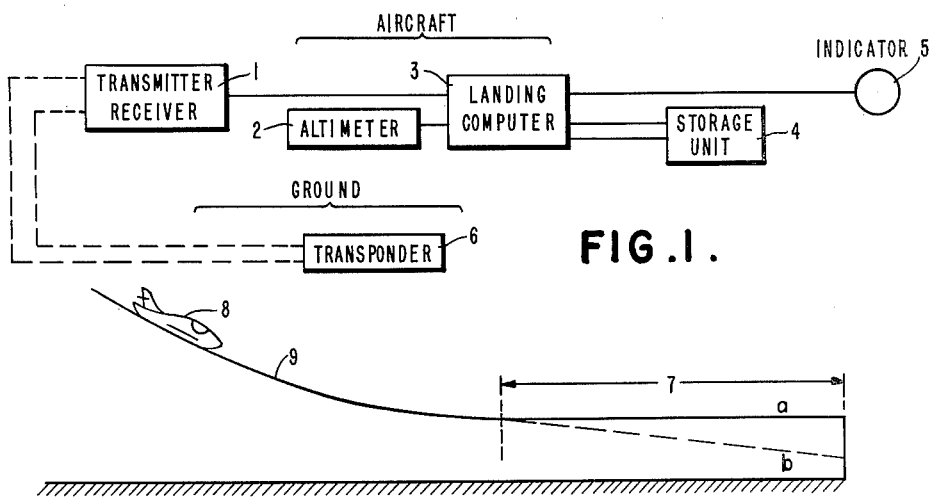
FIGURE 1 is a block diagram of a landing system according to the present invention.

Referring now to the drawings and to FIGURE 1 thereof in particular, the same shows, schematically, the circuit components carried by the aircraft and arranged at the ground station, the illustrated system including, besides an altimeter, only those components needed to obtain a measurement of the distance of the craft from the ground station at the landing point at the start of the landing approach. The ground station is indicated at 6 and comprises a transponder, e.g., a receiver-transmitter which, upon the reception of a signal identified as coming from the craft, responds and transmits a signal. The components 1 to 5 are carried aboard the aircraft, component 1 being a transmitter-receiver which sends out a signal and which receives the signal sent back by the transponder 6. The transit time of the signal, i.e., the time interval between the instant at which the component 1 sends out a signal and the instant at which it receives the signal back from the transponder 6, is used to derive the distance between the aircraft and the ground station. In practice, three transponder stations will be required if the system is to allow the craft to approach the landing point from any direction, which transponders will be arranged in a given geometrical configuration. The component 1 will then be arranged to coact with the three transponder stations.

The signals are applied to a landing computer 3 which also receives the output of an electronic altimeter 2. The predetermined values of the measurement to be determined are taken from a storage unit 4 whose output is connected to the computer 3. The output of the storage unit 4 itself is controlled in dependence of the distance of the craft from the landing point, hence the two opposed arrows between the components 3 and 4. The output of the computer 3, representing the difference between the actual speed of the craft, which is derived from the rate at which the distance between the craft and the landing point changes, and the predetermined speed as put out by the storage unit 4, is applied to an indicator 5. The pilot will then so maneuver the craft that the reading of indicator 5 is zero, i.e., that the reading shows no difference between the predetermined speed and the actual speed.

Figure 2:
FIGURE 2 shows the letdown and approach for a vertical landing.
Figure 3:
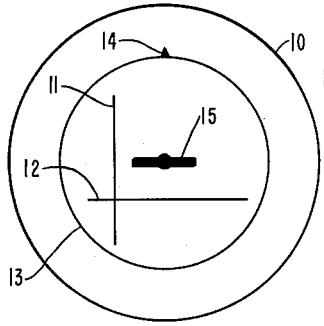
FIGURES 3 to 8 are illustrations of the screen of a cathode ray tube showing the visual representations offered to the pilot during a vertical landing.

FIGURE 2 shows the principle underlying a VTOL landing. The aircraft 8 flying an approach 9 reaches the transition phase 7, during which the craft must be so controlled that the horizontal component of the flying speed reaches zero at the end of the transition phase. The transition can occur while the craft is moving along a horizontal flight path *a*, or along a descending path *b*. The end point of the transition phase, i.e., the hovering point just before the landing, is approximately vertically above the touch-down point at which the craft makes contact with the ground.

Figure 4:
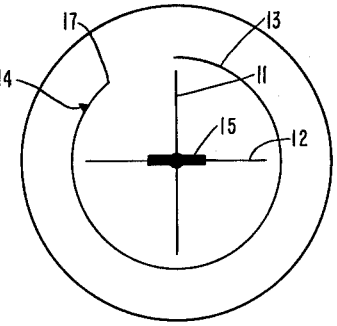

FIGURES 3 to 8 show how the landing values can be represented visually by electronic means. The same include a screen 10 of a cathode ray tube, in the center of which is drawn a symbol—the so-called "bug"—representing the aircraft. The vertical luminous line 11 and the horizontal luminous line 12 represent, respectively, the lateral position and altitude with reference to a predetermined value. Let it be assumed that the aircraft has approached the landing point at an arbitrary altitude and at an arbitrary speed. The actual approach begins at a given distance from the landing point, this being the approach for which the altitude profile of the landing computer has been programmed. The two luminous lines 11 and 12 at the lower left of the indicator bug tell the pilot that his aircraft is to the right of and above the landing point. The pilot will therefore maneuver the craft to the left and down so that the luminous lines 11, 12, will intersect in the middle of the bug 15. This is shown in FIGURE 4.

The lines 11 and 12 are surrounded by a circle 13, produced by an electron beam, and by a speed marker line 14. The position of the speed marker line 14 on the circle corresponds to the programmed predetermined speed, the speed marker line 14, in its rest position, being directly above the bug (i.e., in the "12 o'clock" position). The circumferential length of the circular arc 13 represents the actual speed of the aircraft.

When the start of the transition phase 7 (see FIGURE 2) is reached, the aircraft has to be decelerated. The speed marker line 14 thus begins to move out of its rest position and, as the craft slows down, moves around the entire circle. The pilot will thus so decelerate the craft that the end point 17 of the arc will coincide with the marker line 14 as the same moves around the circle. This is not yet the case under the conditions depicted in FIGURE 4. The representation of FIGURE 4 will, however, let the pilot know that his actual speed is, at this time, still somewhat greater than the predetermined speed.

Figure 5:
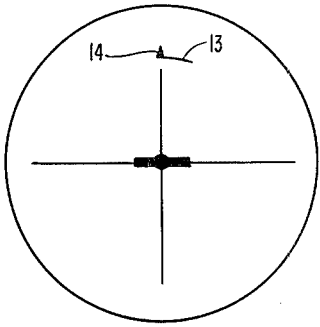

In FIGURE 5, the aircraft is shown as being directly over the landing point, the predetermined speed at this point of the landing being zero, as indicated by the position of the speed marker line 14 which, having now completed its sweep around the circle 13, is once again at the 12 o'clock position. The actual speed of the craft, represented by the length of the arc 13, is not yet zero so that the pilot will have to bring the forward speed down to zero.

Figure 6:
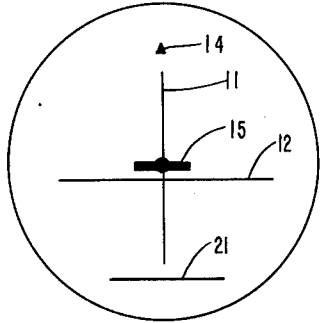

Next on the program is the vertical descent of the craft. This information is conveyed to the pilot by the fact that the horizontal line will, under the influence of the program fed by the storage unit, begin to move downwardly, as shown in FIGURE 6. In order to bring the line 12 into alignment with the bug 15, the pilot has to reduce the altitude of the craft until it touches ground.

For psychological reasons, it is advisable that the pilot be given an indication of his altitude above ground. This can be done by means of a further short horizontal line 21 at the bottom of the screen of the tube, as shown in FIGURE 6. The distance between this ground marker line 21 and the bug 15 will represent the instantaneous altitude of the aircraft above ground. As the craft continues to settle, the ground marker line 21 moves up until, at the instant the craft touches ground, the line 21 reaches the bug 15.

The above type of representation, during the vertical descent, may in some cases be considered as not being sufficient. Here it appears to be of importance at what altitude the craft is above ground and what minimum visibility conditions have to be considered. Actually, once the craft is very low, the downwardly directed exhaust of the jet engine or engines—this being the type of engine generally used for VTOL craft—will disperse even relatively heavy fog, so that the pilot will be, at least for the final portion of the vertical descent, able to see the ground and complete his landing by visual reference.

Figure 7:
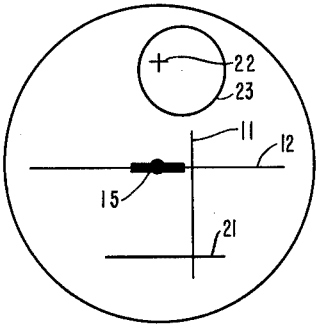
Figure 8:
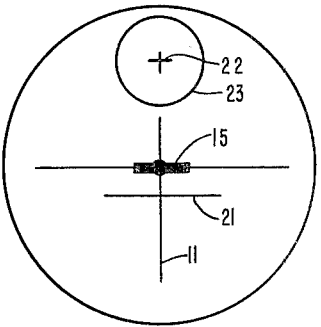

If, nevertheless, it is desired that the exact touchdown point be represented on the screen of the cathode ray tube, a symbolic representation of the touch-down point can be shown at the upper portion of the screen, as illustrated in FIGURES 7 and 8. If this representation is commenced at the time the craft has reached the hovering point, there will be ample room on the screen inasmuch as, at this portion of the landing, the pilot will no longer be interested in any speed indication, his speed, at this time, being zero. Consequently, the speed indication constituted by the circle 13 and the speed marker line 14 can now disappear from the representation.

The location of the touch-down point is represented by a small circle 23, produced on the screen of the tube by an electron beam. A cross or point 22 is also projected on the screen by means of an electron beam which point, however, is stationary with respect to the screen and represents a plan view of the aircraft, i.e., a further "bug". Thus, the representation depicted in FIGURE 7 will indicate to the pilot that the craft has moved beyond the touch-down point and drifted somewhat leftwardly. The circle 23 is thus eccentric with respect to the bug 22. The lateral drift is additionally shown by the fact that the vertical line 11 has moved to the right of the bug 15. Assuming that, by displacing the jet nozzle, the craft can be maneuvered in all directions, the pilot will strive to keep the circle centered with respect to the bug 22, so that the circle will appear as shown in FIGURE 8, i.e., in a position in which the bug 22 is in the center of the circle 23. The manner in which the various markers 11, 12, 13, 14, 21, 22, 23, are made to appear on the screen of a cathode ray tube is part of the prior art. It is advantageous to use a tube with one electron beam only, fitted with a fluorescent screen whose time of persistance is relatively long. The markers are generated in turn one after another but, due to the longer reaction time of the human eye, they will appear as one picture.

Figure 9:
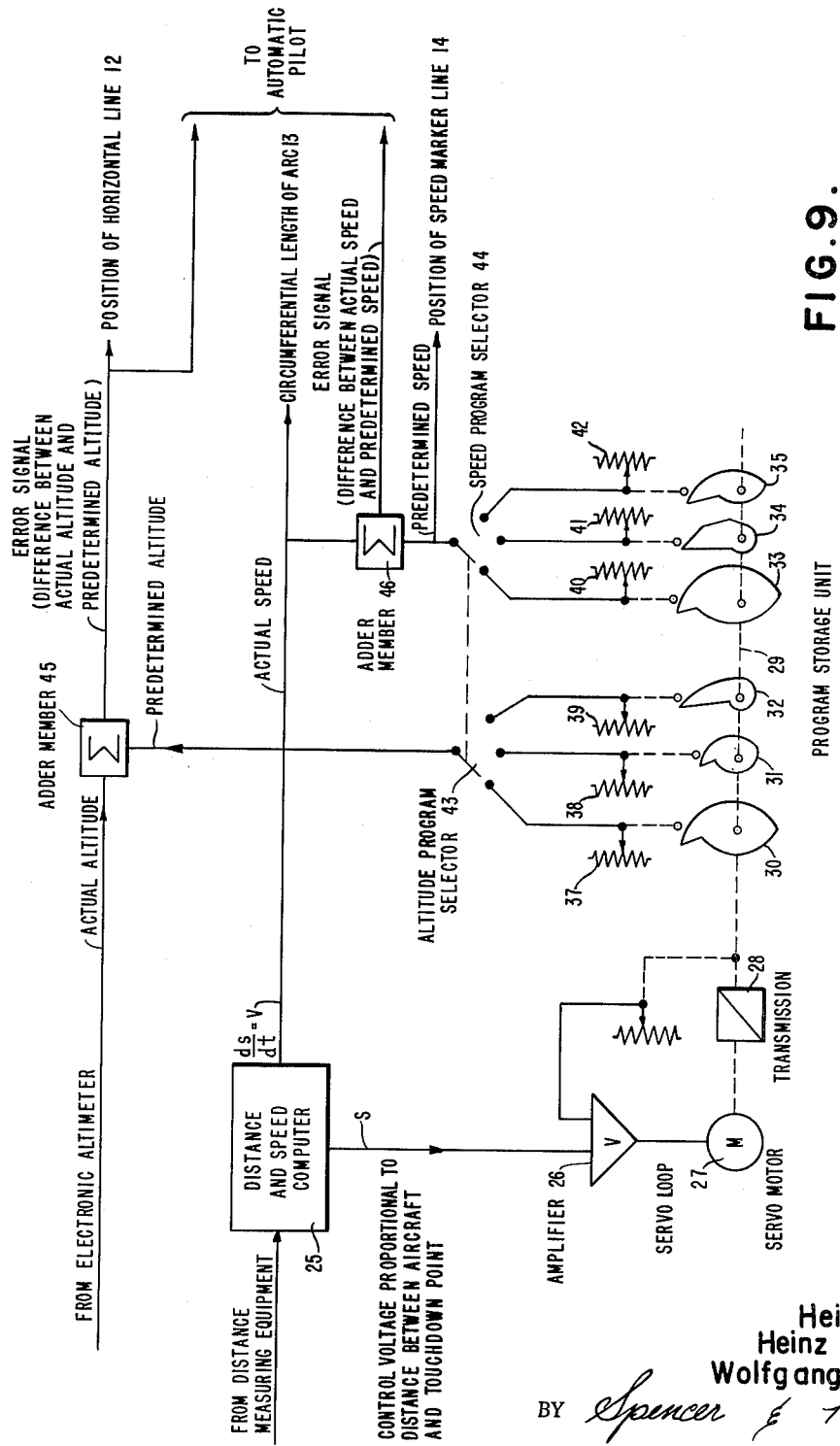
FIGURE 9 is a detailed circuit diagram of the components of the landing system according to the present invention which are carried aboard the aircraft, the output of which system may be applied to a cathode ray tube to produce visual representations of the type illustrated in FIGURES 3 to 8.

FIGURE 9 shows an arrangement including, as the program control device, a storage unit comparable to the above-mentioned storage unit 4, this storage unit being in the nature of a mechanical storage unit incorporating cam discs.

The information received from the distance measuring receiver is processed by the distance and speed computer 25. The latter puts out a control voltage which is proportional to the distance $s$ between the aircraft and the touch-down point. This voltage, which thus represents the actual distance, is applied to a servoloop which comprises an amplifier 26 and a servo motor 27, the latter driving, via suitable reduction gearing 28, a shaft 29 carrying the control cams 30, 31, 32, 33, 34, 35, the first three of which are altitude program control cams and the last three of which are speed program control cams. Each of the cams drives a respective linear potentiometer 37, 38, 39, 40, 41, 42. Rotary potentiometers can be used if suitable lever and/or gear drives are provided. The voltage at the tap of each potentiometer thus represents the instantaneous predetermined value for altitude (potentiometers 37, 38 and 39) or speed (potentiometers 40, 41 and 42). Two program selector switches 43 and 44, one for altitude and the other for speed, allow the desired altitude and speed profiles to be selected. The two selector switches are preferably ganged with each other so that each altitude profile will be linked with a corresponding speed profile.

The predetermined altitude and the actual altitude, derived from an electronic high-frequency altimeter, are applied—as electrical signals—to an adder member 45 which compares the two values and puts an error signal representing the difference between the actual altitude and the predetermined altitude. This signal controls the position of the horizontal line 12.

The signal representing the predetermined speed can be used directly for controlling the position of the speed marker line 14, while a further signal, representing the actual speed, is derived from the distance and speed computer 25 which puts out, in addition to a signal representing the distance $s$, the first derivative $ds/dt=V$, i.e., the rate at which the distance between the craft and the touch-down point changes and hence the speed of the craft. This last-mentioned signal is used to control the circumferential length of the circular arc 13.

If desired, an additional adder member 46 may be provided for comparing the predetermined speed, as put out by the speed program selector 44, and the actual speed, as put out by computer 25. The output of the member 46 is thus an error signal representing the difference between the actual speed and the predetermined speed, and this output signal, as well as the output signal of member 45 which represents the difference between the actual altitude and the predetermined altitude, can be applied to the automatic pilot which is suitably adapted to receive these command signals and to control the aircraft accordingly.

The means for producing the vertical marker line 11, whose position with respect to the bug represents the difference between the lateral position which the craft is supposed to occupy during its approach relative to the landing point and the position it actually occupies, are conventional and are used, e.g. in the Bendix Flight Director, for the mechanical movement of a vertical bar. The output of these means may also be applied to the automatic pilot in order to obtain a completely automatic landing system.

The programming has been described for executing a landing. If desired, an appropriate program can be provided for purposes of facilitating a vertical take-off.

The storage unit can be modified in any suitable manner. For example, the cam discs, instead of being mechanically coupled to the potentiometers can be scanned optically, or, if made of metal, inductively or capacitatively. Alternatively, the storage unit can be constituted by electric means exclusively, e.g., resistance networks which are electronically gated. If the computer 25 is a digitally operating computer, any suitable type of digital storage units can be used. The use of digitally operating storage units facilitates the formation of the difference values.

The storage means described above are so arranged as to allow any one of a number of different programs to be followed. This is an important practical feature inasmuch as it allows different terrain and different tactical problems to be taken into consideration. If desired, the system may be so arranged that the change-over of the program selector switches 43, 44, are actuatable either by the pilot or, via remote control, from the ground station.

The precise profile of the altitude and speed programs will depend, in addition to the above factors, on the particular characteristics of the aircraft, e.g., its weight, its aerodynamic characteristics, and the like.

As set forth above, the system should, for practical purposes, be such that it allows the craft to approach the touch-down point from any direction. This means that the craft will, before it can commence its letdown, have to determine its own position, and according to a further feature of the present invention, therefore, the position of the craft in space, i.e., its $x$, $y$, $z$, coordinates, is determined continuously prior to the landing, in any suitable manner. The measured altitude and azimuth values are compared to programmed, i.e., predetermined altitude and azimuth values, thereby to form correction signals which are a function of distance, which signals are brought down to zero by maneuvering the aircraft in the requisite manner.

If an appropriate indication of the position of the craft is made available to the pilot, he can approach the touch-down point from any direction and enter into the transition phase irrespective of the direction from which he approaches the touch-down point.

When high-frequency communication means, i.e., radio links, are used, care must be taken that the communication is not susceptible to being interrupted by jamming transmitters. If the system is to be used for military purposes, the transponder stations should be of a type which allows their easy and rapid installation and removal.

A single transponder will suffice if all that is desired is a measurement of the distance between the aircraft and the landing point. The transponder may, as set forth above, be a radio marker beacon positioned at or near the touch-down point, which beacon can be a modulated reflection radiator, or a transponder constituted by a receiver and a transmitter.

If, as set forth above, the system is so arranged as to allow the craft to approach the landing point from any direction, the $x$ and $y$ coordinates representative of the position of the craft in space can be obtained by means of a radio phase measuring system, preferably a continuous wave system using at least three transponders at the ground station. A system of this type, disclosed and claimed in copending applications Serial No. 267,306 filed March 22, 1963, of Alexander Prichodjko et al., Serial No. 270,907 filed April 5, 1963, of Alexander Prichodjko, now abandoned and Serial No. 293,481, filed July 8, 1963, of Alexander Prichodjko, produces cartesian $x$, $y$, coordinates in digital form, which coordinates are referenced with respect to the middle of a line joining the transponders. A major advantage of such a system is that each of the two cartesian position coordinates is determined solely by multiplying two measured values. Inasmuch as so few operations are needed to determine one coordinate—all that is involved is the taking of two measurements and one multiplication—all of the operations can be carried out by a single, relatively simple and very compact digital computer. The three transponders of the ground station make it possible to obtain a measurement of the distance of the craft from the landing point.

The z-coordinate of the aircraft, i.e., its altitude, is obtained by means of an electronic altimeter whose indicated output value is smoothed by a filter which is adapted to the speed of the craft. This smoothing of the output of the electronic altimeter is of considerable importance, particularly in the case of high-speed aircraft because in the absence of such smoothing, the variations in the altitude of the terrain over which the craft is flying would result in continuous fluctuations of the reading.

It will be appreciated that the system described above is not limited for use with VTOL craft but can be used in conjunction with conventional landing craft. For example, the program contained in the storage unit can be such that the predetermined speed at the instant at which the distance of the craft from the touch-down point is zero is equal not to zero but to the proper landing speed. Once the aircraft touches down at the proper landing speed, the roll-out phase of the landing generally presents no problem.

Going one step further, the roll-out phase of the landing can be taken into consideration by so programming the landing that at a given distance the predetermined altitude is zero and the predetermined speed is equal to the landing speed.

It will be understood that the above description of the present invention is susceptible to various modifications, changes, and adaptations, and the same are intended to be comprehended within the meaning and range of equivalents of the appended claims.

What is claimed is:

1. An aircraft landing system, particularly for use with VTOL craft, said system comprising, in combination:
   (a) means continuously measuring the distance between the craft and a landing point for producing a signal representing the distance between the craft and the landing point and a signal which is the first derivative of said distance signal and hence a signal representing the speed of the craft relative to the landing point;
   (b) storage means containing a predetermined programmed speed profile for the craft during the approach of the craft to the landing point; and
   (c) means responsive to said distance signal produced by said measuring means for driving said storage means to run off the program stored therein in dependence on the distance between the craft and the landing point, whereby the craft may be brought to the landing point at said predetermined speed while so maneuvering the craft as to maintain equal to zero the difference between the speed signal produced by said measuring means and the output of said storage means.

2. A system as defined in claim 1, further comprising means for determining the x, y, z coordinates of the position of the craft in space and hence the bearing and altitude of the craft relative to the landing point; said storage means further containing a predetermined programmed bearing and altitude profile for the craft during the approach of the craft to the landing point, said further storage means also being driven in response to said distance signal produced by said measuring means.

3. A system as defined in claim 1 wherein said storage means comprise a mechanical storage unit incorporating cam disc means whose configuration represents the desired program profile.

4. A system as defined in claim 1 wherein said storage means comprise a plurality of storage devices, and means for selectively activating any of said devices.

5. A system as defined in claim 4 wherein said storage means include a selector switch operable by the pilot of the craft or by a ground station.

6. A system as defined in claim 2 and carried aboard the craft, said system further comprising display means connected to receive said speed signal produced by said measuring means as well as the speed profile put out by said storage means.

7. An aircraft landing system, particularly for use with VTOL craft, said system comprising, in combination:
   (a) measuring means for continuously producing a signal representing the distance between the craft and the landing point and a signal representing the speed of the craft;
   (b) storage means containing a predetermined programmed speed profile for the craft during the approach of the craft to the landing point; and
   (c) means responsive to said distance signal produced by said continuously operating means for driving said storage means to run off the program stored therein in dependence on the distance between the craft and the landing point, whereby the craft may be brought to the landing point while so maneuvering the craft as to maintain equal to zero the difference between the speed signal produced by said continuously operating means and the output of said storage means.

8. A system as defined in claim 7 wherein said measuring means include at least one transponder located at the landing point, and a transmitter-receiver carried aboard the aircraft, said storage means and driving means therefor also being carried aboard the aircraft.

9. An aircraft landing system, particularly for use with VTOL craft, said system comprising, in combination:
   (a) means for continuously producing a signal representing the distance between the craft and the landing point and a signal representing the speed of the craft relative to the landing point;
   (b) storage means containing a predetermined programmed speed profile for the craft during the approach of the craft to the landing point;
   (c) means responsive to said distance signal produced by said continuously operating means for driving said storage means to run off the program stored therein in dependence on the distance between the craft and the landing point; and
   (d) indicating means connected to receive said speed signal produced by said continuously operating means as well as the output of said storage means for indicating the actual speed of the craft and the predetermined speed of the craft, whereby the craft may be brought to the landing point while so maneuvering the craft as to maintain equal to zero the difference between the speed signal produced by said continuously operating means and the output of said storage means.

10. An aircraft landing system, particularly for use with VTOL craft, said system comprising, in combination:
   (a) means for continuously producing a signal representing the distance between the craft and the landing point and a signal representing the speed of the craft;
   (b) storage means containing a predetermined programmed speed profile for the craft during the approach of the craft to the landing point;
   (c) means responsive to said distance signal produced by said continuously operating means for driving said storage means to run off the program stored therein in dependence on the distance between the craft and the landing point; and (d) comparing means connected to receive said speed signal produced by said continuously operating means as well as the output of said storage means for producing an error signal representing the difference between the actual speed of the craft and the predetermined speed, whereby the craft may be brought to the landing point at said predetermined speed by maneuvering the craft to maintain the error signal equal to zero.

11. A landing system for use with a transponder located at a landing point, said system being carried aboard an aircraft and comprising, in combination:

(a) a distance measuring transmitter-receiver coacting with the transponder;

(b) a distance and speed computer connected to said transmitter-receiver for producing, as a function of the transit time of a signal between said transmitter-receiver and the transponder, a signal representing the distance between the craft and the landing point as well as a signal which is the first derivative of the distance signal and hence a signal representing the speed of the craft with respect to the landing point;

(c) a program storage unit including cam means whose configuration represent a speed profile;

(d) servomotor means connected to receive said distance signal from said distance and speed computer for driving said cam means such that the position of the latter is dependent on the distance between the craft and the landing point; and (e) output means connected to receive said speed signal from said distance and speed computer as well as the speed profile of said storage unit.

12. A system as defined in claim 11 wherein said output means comprise a display device for representing the actual speed of the craft in conjunction with the profile speed of the craft, thereby to allow the pilot to maneuver the craft in such a manner as to maintain the difference betwen the actual and profile speeds equal to zero.

13. A system as defined in claim 11 wherein said output means comprise an adder for adding the speed signal put out by said distance and speed computer and the profile speed signal put out by said storage unit, and for producing an error signal representing the difference between the actual and profile speeds.

14. A system as defined in claim 12 wherein the error signal is applied to an automatic pilot.

15. A system as defined in claim 11 wherein said storage unit includes a plurality of cam means, and switch means for selectively activating any one of said cam means, as desired.

16. A system as defined in claim 11, further comprising:

(f) altimeter means for measuring the altitude of the craft and for producing a signal representing the altitude of the craft;

(g) said program storage unit including further cam means whose configuration represents an altitude profile; and (h) further output means connected to receive said altitude signal from said altimeter means as well as the altitude profile from said storage unit.

17. A system as defined in claim 16 wherein said storage unit includes a plurality of cam means each representing a desired speed profile and a further plurality of cam means each representing a desired altitude profile, altitude program selector switch means for selectively activating any one of said altitude profile cam means, and speed program selector switch means for selectively activating any one of said speed profile cam means.

18. A system as defined in claim 17 wherein said two selector switch means are ganged, in consequence of which each altitude profile is correlated to a speed profile.

19. A system as defined in claim 11 wherein said servomotor means comprise an amplifier whose input is connected to receive said distance signal from said distance and speed computer, a motor whose input is connected to the output of said amplifier, reduction gearing having its input connected to said motor and its output to said cam means, and a feedback loop between the output of said reduction gearing and the input of said amplifier.

No references cited.

CHESTER L. JUSTUS, *Primary Examiner.*

R. D. BENNETT, *Assistant Examiner.*